United States Patent
Laurent et al.

(10) Patent No.: US 8,075,719 B2
(45) Date of Patent: Dec. 13, 2011

(54) MANUFACTURE OF COMPLEX COMPOSITE PARTS

(75) Inventors: Philippe Laurent, Fleron (BE); Georges Duchaine, Warsage (BE)

(73) Assignee: Techspace Aero S.A., Milmort (BE)

( * ) Notice: Subject to any disclaimer, the term of this patent is extended or adjusted under 35 U.S.C. 154(b) by 0 days.

(21) Appl. No.: 12/639,517

(22) Filed: Dec. 16, 2009

(65) Prior Publication Data

US 2010/0159762 A1  Jun. 24, 2010

(30) Foreign Application Priority Data

Dec. 19, 2008  (EP) .................................... 08172273

(51) Int. Cl.
*B23B 37/00* (2006.01)
*B29C 70/00* (2006.01)
*B65H 81/00* (2006.01)

(52) U.S. Cl. ........ 156/173; 156/166; 156/168; 156/169; 156/172; 156/184; 156/185; 156/187; 156/247; 264/257; 264/258; 264/313; 264/317

(58) Field of Classification Search .......... 156/166–175, 156/180, 247, 184–195; 264/183, 219–227, 264/247, 257, 258, 134–137, 313, 317
See application file for complete search history.

(56) References Cited

U.S. PATENT DOCUMENTS

| | | | |
|---|---|---|---|
| 3,367,817 A | 2/1968 | Bluck | |
| 4,264,278 A * | 4/1981 | Weingart | 416/226 |
| 5,128,198 A * | 7/1992 | Dyksterhouse et al. | 442/59 |
| 5,176,864 A | 1/1993 | Bates et al. | |
| 5,236,018 A | 8/1993 | Kobayashi et al. | |
| 5,250,779 A * | 10/1993 | Kaufmann et al. | 219/121.12 |
| 2007/0229497 A1 * | 10/2007 | Zinniel et al. | 345/419 |

FOREIGN PATENT DOCUMENTS

EP  1 938 955 A1  7/2008

OTHER PUBLICATIONS

Anonymous; "Flanged Composite Tube" Research Disclosure; Mason Publications, Hampshire, GB; vol. 302, No. 21; Jun. 1, 1989; XP007113802 ISSN: 0374-4353.

* cited by examiner

*Primary Examiner* — Khanh P Nguyen
*Assistant Examiner* — Carson Gross
(74) *Attorney, Agent, or Firm* — Reinhart Boerner Van Deuren P.C.

(57) ABSTRACT

The present invention relates to an automated method for manufacturing layer by layer a composite part with rotational symmetry and complex cross-section, comprising the following stages:

a) a reel or roll comprising a reinforcement is continuously unwound;

b) as an option, the reinforcement is impregnated with a liquid resin by passing through a bath;

c) the impregnated reinforcement is wound onto a rotating cylindrical mandrel;

d) the impregnated reinforcement is completely or partially polymerised in order to obtain a composite material;

e) a support and/or support material is deposited on both sides of the composite material forming the part being manufactured in such a way as to fill the gaps surrounding said part.

12 Claims, 7 Drawing Sheets

MANUFACTURE OF COMPLEX COMPOSITE PARTS

CROSS-REFERENCE TO RELATED PATENT APPLICATIONS

This patent application claims the benefit of European Application No. 08172273.8, filed Dec. 19, 2008, the entire teachings and disclosure of which are incorporated herein by reference thereto.

FIELD OF THE INVENTION

The present invention relates to an automated method for manufacturing composite parts with rotational symmetry and complex cross-section.

More particularly, it relates to the manufacture of parts intended for the aeronautics field.

STATE OF THE ART

In the aeronautics field, one major industrial and technological innovation is without any doubt the introduction of composite materials since they allow to considerably reduce the weight of the parts used and to obtain better resistance to fatigue.

Various methods are known for the manufacture of composite parts with rotational symmetry and simple geometry.

Mention may be made of, among others, centrifugal casting, which consists in depositing resin and cut threads inside a rotating cylindrical mould. The drawback of this method is that it only allows to manufacture cylindrical shapes.

Mention may also be made of filament winding, which is a manufacturing method by the continuous deposition of threads or rovings (group of threads), pre-impregnated with resin, on a rotating mandrel. The drawback of this method is that it only allows to produce parts with rotational symmetry and simple geometry.

Figure 1:
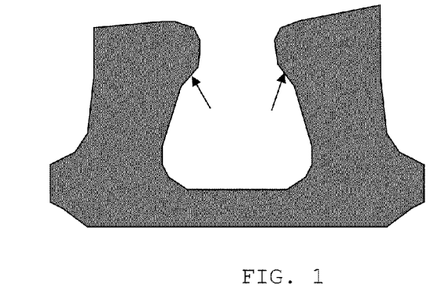
FIG. 1, already mentioned, shows a partial section of the drum of a low-pressure compressor.

In the aeronautics field, numerous parts with rotational symmetry have complex cross-sections. By way of an example, FIG. 1 shows part of the drum of a low-pressure compressor of an airplane engine; this part has a variable cross-section (along the radius) as well as several projecting zones (indicated by arrows).

There is great interest in the manufacture of such parts made of composite material given the significant improvement in terms of weight that it would entail.

Patent application EP 1 938 955 A1 presents a device for manufacturing parts with rotational symmetry and complex cross-sections made of composite material. In the disclosed device, fabric is wrapped around a mandrel having the geometry of the part to be manufactured. Such a device has the drawback of requiring a mandrel for each shape of the part to be produced and of not allowing to produce parts with projecting zones.

U.S. Pat. No. 5,176,864 A presents a lost-wax method. The wax mandrel acting as the support is melted after the part is manufactured. This method has the same drawbacks as those described above.

AIMS OF THE INVENTION

The present invention aims to provide an automated method for producing composite parts with rotational symmetry and complex cross-section.

The present invention aims more particularly to provide a method allowing to produce parts with variable geometries from the same tooling.

As a result, the present invention will allow to manufacture parts with a significantly reduced weight.

MAIN CHARACTERISTIC FEATURES OF THE INVENTION

The present invention relates to an automated method for manufacturing layer by layer a composite part with rotational symmetry and complex cross-section, comprising the following stages:
a) a reel or roll having reinforcement is continuously unwound;
b) as an option, the reinforcement is impregnated with a liquid resin by passing through a bath;
c) the impregnated reinforcement is wound onto a rotating cylindrical mandrel;
d) the impregnated reinforcement is completely or partially polymerised in order to obtain a composite material;
e) a support and/or a support material is deposited on both sides of the composite material making up the part being manufactured in such a way as to fill the gaps surrounding said part.

According to particular embodiments of the invention, the method comprises at least one or a suitable combination of the following characteristics:
- the reinforcement is fabric or braid;
- the reinforcement may be pre-impregnated with resin or be a dry fabric or braid in combination with a binder, in which case stage b) is not performed;
- the support comprises the reinforcement impregnated with the support material;
- it also comprises a stage a') for automatically cutting the reinforcement into strips called "reinforcements" and into strips called "off-cuts" of variable widths depending on the geometry of the part to be produced, after stage a);
- in parallel with stage b), the "offcut" strips are impregnated by the support material, thus forming the support that will be used in stage e);
- in stage d), the cross-linking of the resin is initiated by UV or IR radiation;
- in stage d), the impregnated reinforcement is heated by the Joule effect by means of a variable magnetic field applied to the part being produced;
- the support material is deposited by atomisation of fine droplets by means of a spray head, said support material being in liquid form with a suitable viscosity for spraying;
- it also comprises a stage for stitching the impregnated reinforcements partially polymerised in stage d), said stitching being achieved in a direction that is perpendicular to the wounded reinforcement pleats;
- the finished part is subjected to a post-polymerisation cycle;
- the resin is a thermosetting resin, that is catalysed by means of a photo-initiator or a thermo-initiator;
- the support material is a material with a low melting point, a material soluble in a solvent, a breakable material, i.e. friable after solidification, or a powdery material at specific temperatures;
- after the part is produced layer by layer, the support or the support material is separated from the part and the part is removed from its mandrel.

The present invention also relates to a composite part with rotational symmetry and a complex cross-section obtained by the method as in any of claims 1 to 14.

KEY

1) Reel of threads or rovings
2) Bath of liquid resin
3) Pulley
4) Mandrel
5) UV or IR source
6) Spray head of the support material
7) Cross-section of a part with rotational symmetry
8) Cross-section of a thread
9) Support material
10) Cross-section of another thread
11) Fabric roll
12) Work zone
13) Layer No. i
14) Layer No. j
15) "Reinforcement" strip
16) "Offcut" strip
17) Tank of support material
18) Calibration roll
19) First scraper
20) Composite
21) Support (reinforcement+support material)
22) Resin-impregnated reinforcement
23) Second scraper

DETAILED DESCRIPTION OF THE INVENTION

The present invention relates to a method for manufacturing composite pieces with rotational symmetry and a complex cross-section.

This new method must allow to produce functional parts with mechanical and thermal features that are sufficient for them to be directly integrated into an assembly such as for example the low-pressure compressor of an airplane engine. More particularly, such a method may be used for producing complex parts such as drums, inner sleeves, outer sleeves, . . . .

The method as in the invention is based on an inventive combination of three techniques:
  The above-described thread winding, currently used as a method for manufacturing composite parts with rotational symmetry and with simple geometry.
  The principle of layer-by-layer construction produced by electronic means from a CAD (Computer Aided Design) file of the part. The program virtually cuts the part and sends the binary data to the machine. This principle is used to particular advantage in techniques called "rapid prototyping".
  The deposition of a support material during manufacture. This material is only used for the manufacture and must be separated from the part once it is finished. The role of the support material is to hold the part being manufactured in place. In the case of a part with projecting zones such as that of FIG. 1, it is essential for the new layers to be deposited onto a support material and not in a gap, in order to avoid any flow. The sides of the part will also be held in a sandwich by the support material. The support material must therefore be rigid enough and allow easy extraction of the composite part without affecting its properties.

Several materials may be suitable:
  Material with low melting points that must melt at a temperature that is low enough to prevent deterioration of the composite material. Mention may be made of wax, for example.
  Material that is soluble in water or in any other solvent, such as for instance plaster or Aquacore™ (ceramic material).
  Material that becomes powdery below a specific temperature, such as pure tin. The latter has a melting temperature of 232° C. and becomes powdery below −50° C., which corresponds to the limits of use required of a composite material, it therefore should not present a problem if the part is cooled to such a temperature in order to eliminate the support material.
  Starch-based materials.
  Salt or sand which, once solidified, are broken up or dissolved in water.

The empty zones of the part to be produced will be filled with this support material. One alternative is to fill these gaps with a system or support comprising the reinforcement and the support material.

Ideally, the part produced by the method as in the invention must meet the size requirements in addition to having the mechanical and physical features required for the application. However, it is probable that, as in any method for manufacturing composite parts, the tight size tolerances will not be achievable in a first stage. In that event, two solutions can be envisaged.

The first consists in producing a pre-form of a slightly larger size than the finished part. In this case, the dimensions are adjusted by removing material with conventional methods such as turning, etc.

The second solution consists in producing a pre-form of a slightly smaller size than the finished part. In this case, the pre-form may then be placed between two moulds, precisely machined to the dimensions of the part, with a view to being impregnated.

Even if this second solution must achieve a total mass of fibre that is slightly lower than that of the first solution, it must be preferred since the machining renders the part fragile (delamination initiation, fibre breakage, peeling-off of the gel coat, etc.).

The composite material obtained by the method as in the invention comprises a matrix made of resin and a reinforcement.

The choice of the matrix and reinforcement will depend on the properties required (tensile strength, Young modulus, expansion coefficient, etc.). By way of an example, the matrix may be an epoxy resin or a phenolic resin and the reinforcement may be made of carbon, Kevlar® (aramid) or glass. The resin will be catalysed by means of thermo-initiators and possibly photo-initiators.

The method described below is a "long-fibre" method offering better mechanical properties (elasticity modulus, tensile strength, toughness, etc.) than "short-fibre" methods and where the reinforcement may be made of a thread (or roving), of fabric or braid.

According to a first embodiment of the invention, the method will be described below for a reinforcement of the thread type. Then, a variant of this method will be described for a reinforcement of the fabric or braid type.

The "thread-reinforcement" method (TRM) is based on the filament-winding method.

The composite material is formed of a thread or roving impregnated with resin and continuously wound around a mandrel. The support material is also continuously deposited during manufacture.

Figure 2:
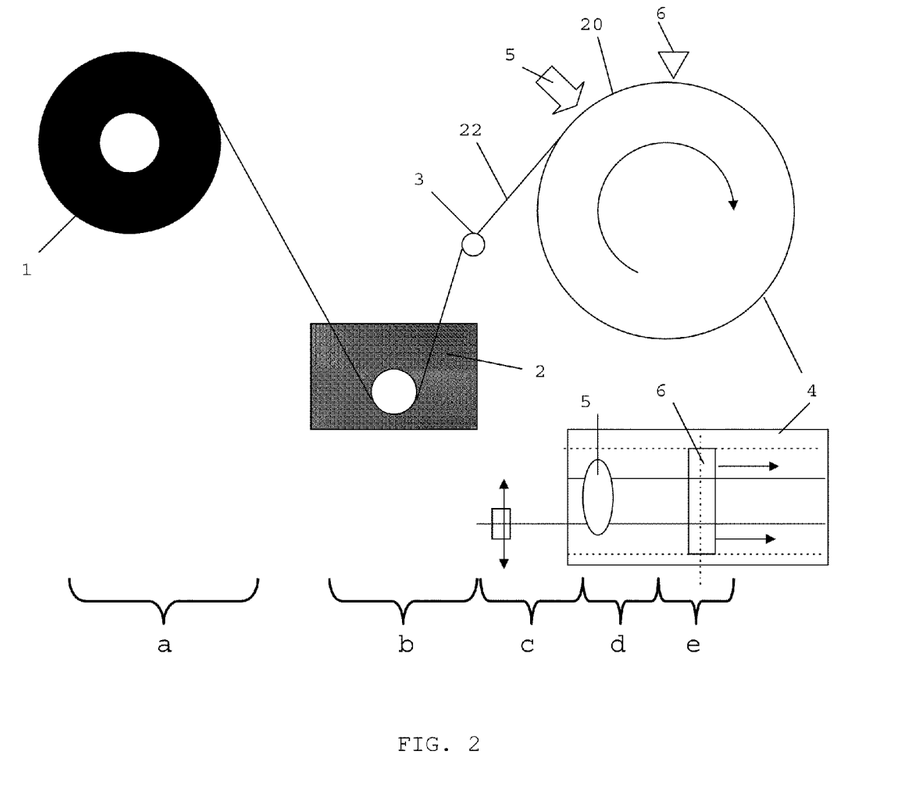
FIG. 2 schematically shows the various stages of the reinforcement method with threads as in the invention.

FIG. 2 schematically shows the five stages of the thread-reinforcement method as in the invention.

Stage a) relates to the unwinding of the reinforcement. A reinforcement roll 1 of thread or roving is continuously unwound. The unwinding speed depends on the manufacture speed. One alternative is the direct use of pre-impregnated threads, in which case stage b) described below is rendered superfluous. For the sake of clarity, the reinforcement will be considered as being formed from a single thread of diameter D.

Stage b) relates to the impregnation of the thread (or roving). The latter will form the reinforcement of the composite part. It will therefore be impregnated in a bath of liquid and catalysed resin 2 (wet process). As mentioned earlier, this stage does not occur in the event that pre-impregnated threads, also called pre-pregs, are used (dry process).

Stage c) relates to the winding of the thread onto the mandrel. The thread, guided by a pulley 3 whose axial motion is precisely controlled, is wound over a mandrel 4. Ideally, the mandrel is made of stainless steel. It may be waxed to aid removal of the finished part from the mould. The finished part will be formed from several layers with a thickness that equals the diameter D of the thread (not taking into account the thickness of the thin film of resin). Each layer will be formed from several contiguous coils on the assumption of winding at about 90° relative to the axis of the mandrel. To achieve this, the guiding pulley moves in the axial direction by an amount D at each turn of the mandrel.

Stage d) relates to the polymerisation of the resin. Either the polymerisation during manufacturing is sufficient to achieve a maximum level of polymerisation or a partial level of polymerisation is achieved. In the latter case, the finished part will have to be subjected to a post-polymerisation cycle. Obviously, the cylindrical zone between the deposition of the support material and the deposition of the thread impregnated with resin—namely the part of the mandrel that has not been used so far—may be put to good use in continuing the polymerisation of the composite material and/or the hardening of the support material (e.g. drying the plaster). The cross-linking of the resin may be initiated by UV or IR radiation 5. The advantage of UV radiation is that there is no risk of it melting the support material if the latter is of a type that could melt. In the present case where the reinforcement is simply formed by a thread, UV light will diffuse and diffract in such a way that the adhesion of the thread to the preceding layer will probably be sufficient. For the TRM method, a UV source therefore seems preferable to an IR source. Post-curing may always be envisaged in order to achieve polymerisation of the matrix for the parts of resins less exposed to UV radiation.

Stage e) relates to the deposition of the support material. The material must be in the form of a relatively viscous liquid so as to allow its deposition. It is important that the thickness of the support material should be equal to the thickness of the layer of composite material, itself equal to D. There are wax-deposition techniques that are very precise and used in particular in rapid prototyping techniques. In this case, wax is deposited in fine droplets by means of a head 6 formed by a hundred or so small spray nozzles arranged side by side. The lower right part of FIG. 2 shows a top view of the mandrel where the configuration of the UV or IR source 5 and of the spray head 6 over the mandrel 4 can be seen. The width of this head (about 200 mm) must be equal to the width of the work zone. Otherwise, several heads may be used.

The above-described method will be clearer with the aid of FIGS. 3A to 3G describing the successive stages of the manufacture of a complex part with rotational symmetry, respectively. We will limit ourselves by way of an example to the first five layers, with a thread diameter that was voluntarily chosen thick to facilitate the explanation.

Figure 3A:
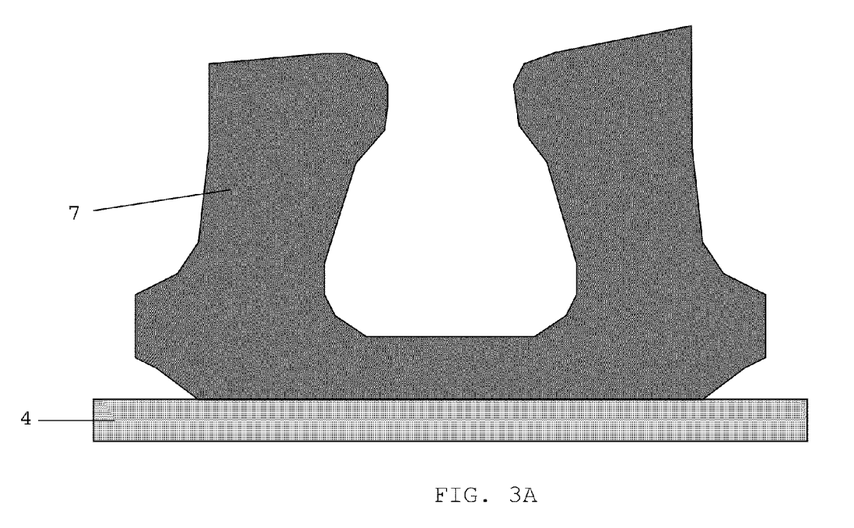
FIGS. 3A to 3G give a detailed description of the various stages for producing a part layer by layer as in the invention.
Figure 3B:
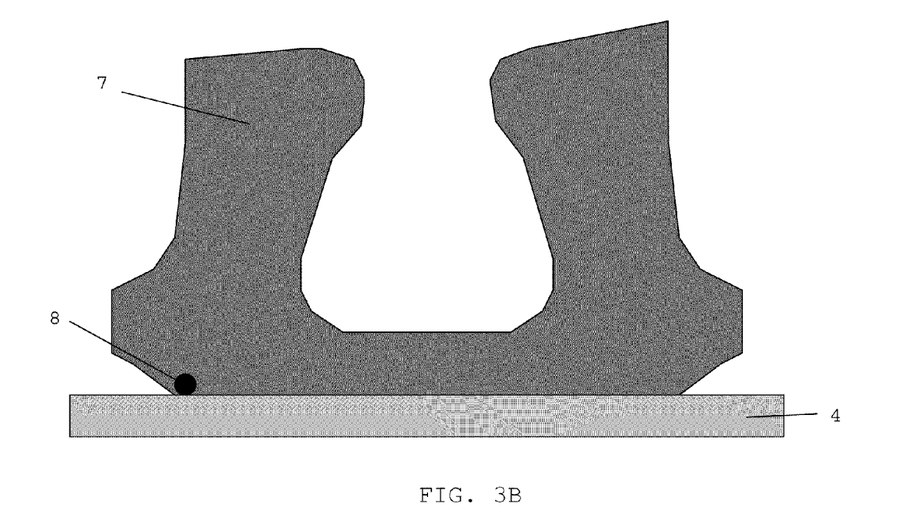
Figure 3C:
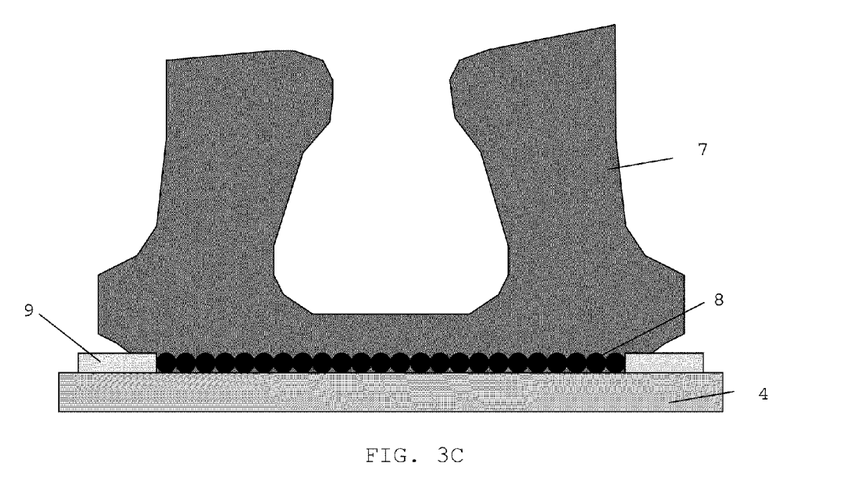
Figure 3D:
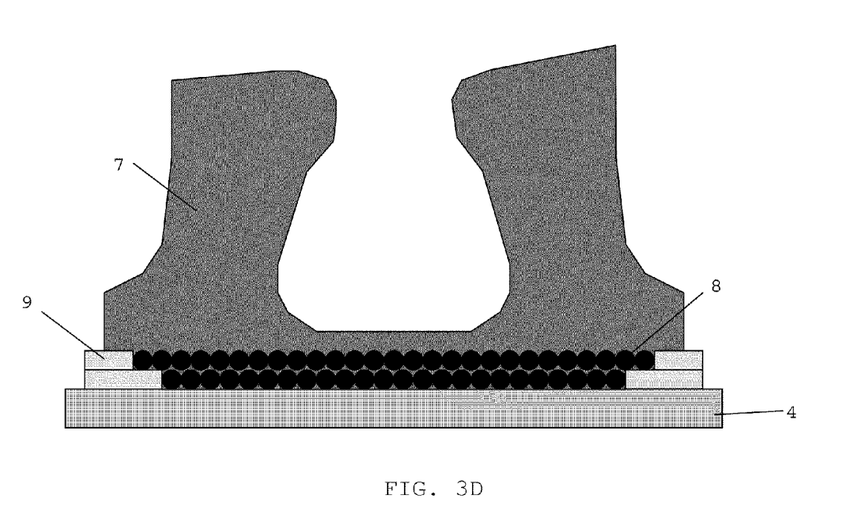
Figure 3E:
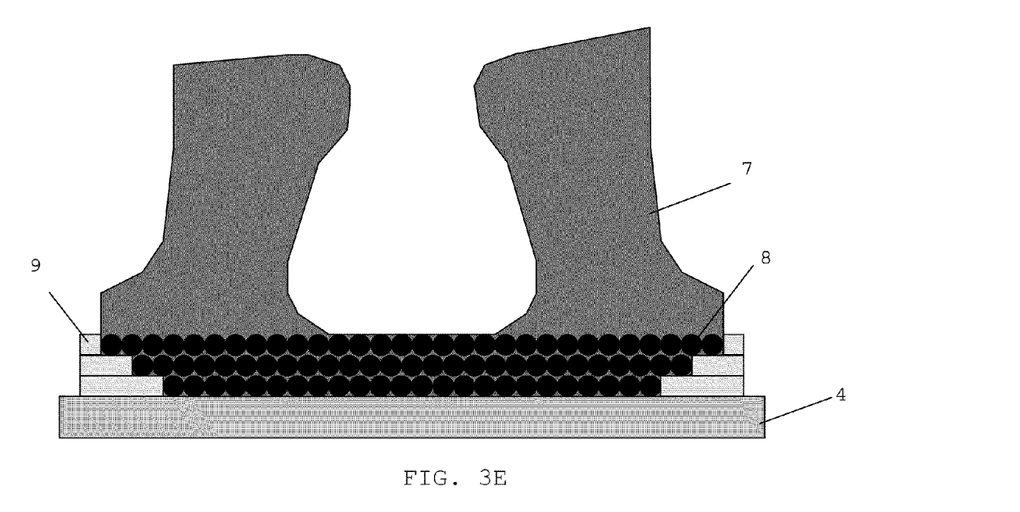
Figure 3F:
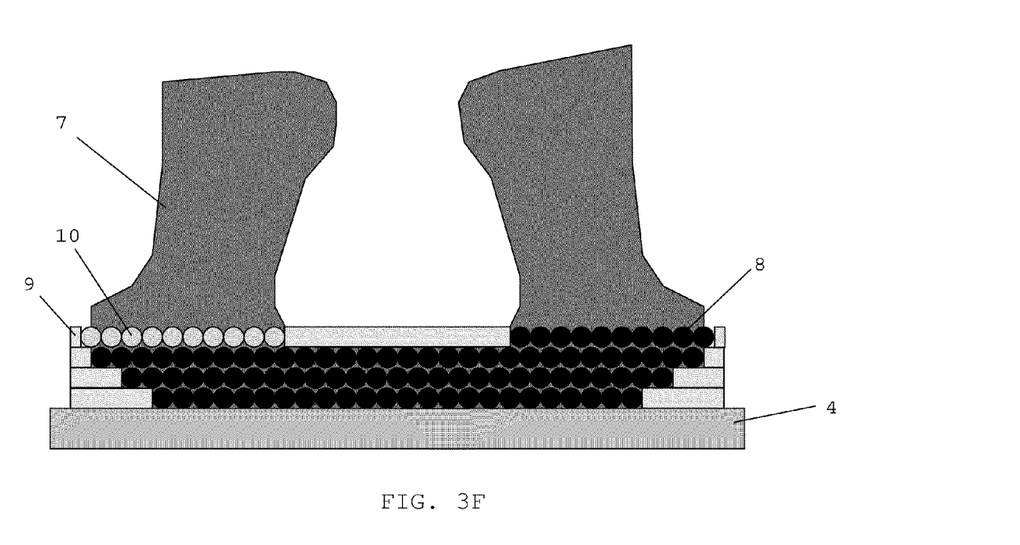
Figure 3G:
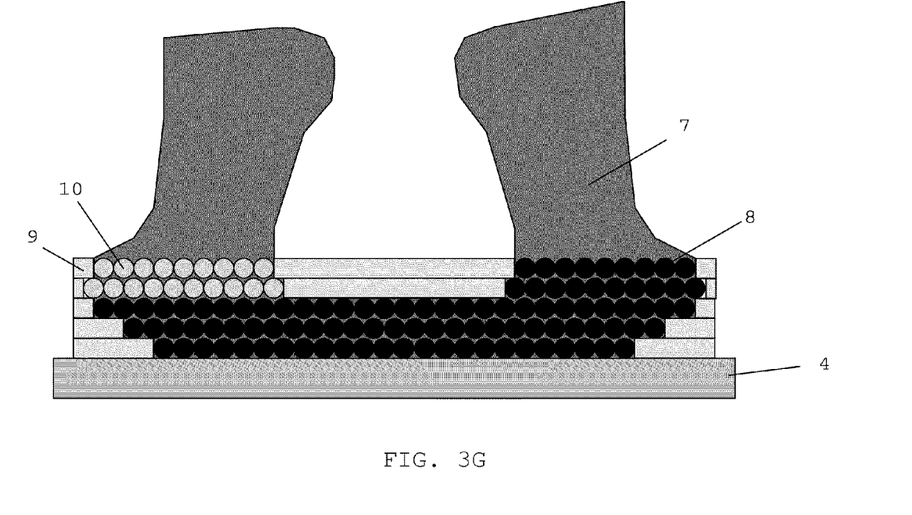

The cross-section of the part 7 to be produced is shown in FIG. 3A. The winding of the first coil starts with the area at the left end of the part. The black spot 8 represents the cross-section of the thread (FIG. 3B). To produce the first layer, the guiding pulley moves from left to right in such a way as to form contiguous coils. Whilst the first layer is being produced, the support material 9, that is wax, is deposited on both sides of the part (FIG. 3C). The second layer is produced similarly to the first layer with the pulley moving from right to left (FIG. 3D). The third layer is produced identically to the first layer with the pulley moving from left to right (FIG. 3E). The fourth layer is more complex to produce since it requires the simultaneous production of two distinct areas in composite material (FIG. 3F). A thread 10 from a second reel must then be wound so as to produce the left area of the part. It will be noted that, from this layer onwards, the support material (wax) is equally deposited between these two areas of the composite material. The fifth layer and subsequent layers are achieved similarly to the fourth (FIG. 3G).

One variant of the above-described method is to use a 2D fabric or a flat braid rather than a thread as reinforcement. The reinforcement used in this variant of the method may for example be fabric with carbon fibres orientated at 0 and 90° (fabric 0/90°) or a bi-axial flat braid with an angle of 60° between the carbon fibres or a tri-axial flat braid (0/±60° quasi-isotropic braid), the latter allowing to obtain better levels of impact resistance and mechanical properties that are almost identical in all directions of the plane of the flat braid. The reinforcement may also be made of alternating layers of fabric and braid, this alternation allowing to improve the overall mechanical properties. Any other reinforcement, such as for example a 3D reinforcement (stitching, Z-pinning, etc.) may also, according to the invention, be applied in order to improve the interlaminar properties of the composite part.

Figure 4:
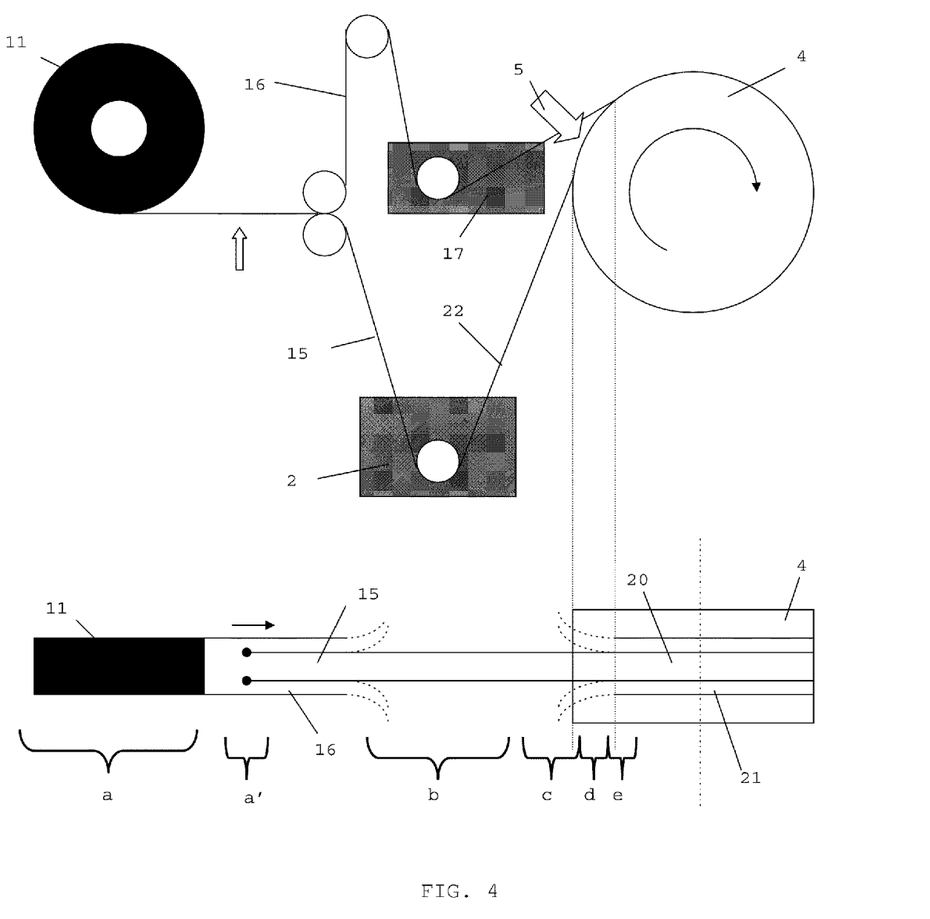
FIG. 4 schematically shows the stages of the reinforcement method with fabric or braid as in the invention.

Using a fabric (or a braid) instead of a thread requires to modify some stages of the TRM method. The method known as "fabric-reinforcement" (or braid reinforcement), also called FRM, comprises six consecutive stages as shown in FIG. 4. The method for fabric reinforcement will be described below but this of course also applies to a braid reinforcement.

Stage a) relates to the unwinding of the reinforcement in a manner that is similar to the TRM method. A roll of reinforcement made of dry fabric 11 is continuously unwound. The unwinding speed depends on the manufacturing speed. One alternative is to directly use pre-impregnated fabric, in which event stage b) described below is rendered superfluous.

Figure 5:
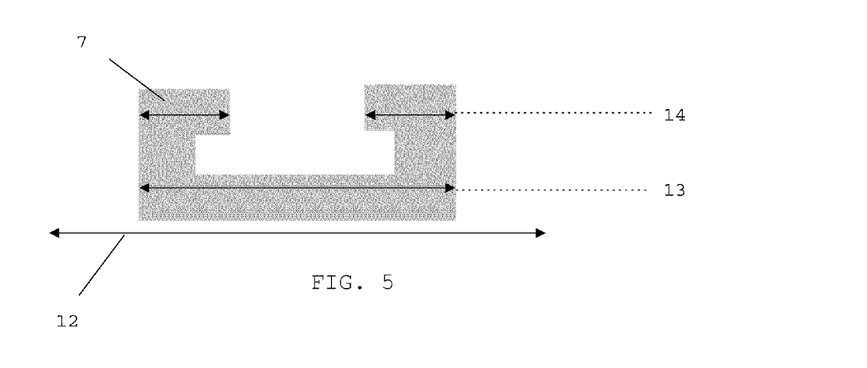
FIG. 5 shows the cross-section of a part with rotational symmetry obtained according to the invention with strips of reinforcing fabric (or braid) schematically shown.

The FRM method requires an additional stage, stage a'), for cutting the strip of fabric to the desired width (indicated by a vertical arrow in FIG. 4). Depending on the layer being produced and on the CAD file of the part, the machine calculates the width of the strip(s) of fabric to be deposited as shown in FIG. 5. The work zone 12 is wider than the part so that the support maintains the outer walls of the part during manufacture.

The cut may be parallel or perpendicular to the motion direction of the strips depending on the geometry of the part to be produced.

For a cut that is parallel to the motion direction, the fabric may be automatically cut by laser, water jet or mechanical means. Techniques for cutting pre-pregs by computer numerically controlled (CNC) machines already give satisfactory results. The total width of the strip of fabric equals the width of the work zone as shown in FIG. 5. It is essential for the speed of the cut to be significantly greater than the motion speed of the fabric. Making two cuts parallel to the motion direction of the fabric is then possible by means of one single cutting system. The current accuracy in the positioning of the cutting system chosen must allow to sequentially achieve a single cut (laser, mechanical cut, etc.).

In the example shown in FIG. 5, a single wide strip of fabric is required to produce layer No. i indicated by 13. To produce layer No. j indicated by 14, four cuts that are parallel to the motion direction of the fabric are required and they produce two strips of reinforcement fabric, called "reinforcement" strips and three strips of fabric off-cuts, called "offcut" strips. It will be later seen that the "reinforcement" strips 15 move towards a tank of resin 2 whereas the "offcut" strips 16 are directed towards another tank 17 (see FIG. 4).

The cutting tool, e.g. a laser spot, may also move perpendicularly to the motion direction. Let us take the example of a sleeve in which there is a series of openings arranged more or less radially. Cutting this type of form does not pose any problem for a CNC cutting system. However, the motion speed of the fabric, i.e. the movement of the fabric relative to the cutting machine, must be taken into account. Once again, on the assumption of a cutting speed much greater than the motion speed, this should not cause any problems.

It should be noted that in the case of a reinforcement with alternating fabric and braid, it is necessary to have two independent cutting systems available for each type of reinforcement.

Stage b) relates to the impregnation of the reinforcement as for the TRM method. The "reinforcement" strip 15 will make up the reinforcement of the composite part as its name indicates. Thus, it will be impregnated in a bath of liquid and catalysed resin 2 (wet process). This stage does not occur in the event of the use of pre-pregs (dry process) or in the case of dry fabric associated with a "binder".

The "offcut" strips 16 may be used as support and, in this event, they may be directed towards a tank 17 where they are impregnated with support material such as for example hot wax or wet plaster, or they can simply be impregnated with a mould-release agent. The latter solution should probably be avoided since the mould-release agent has very low viscosity and, as a result, there is a risk that the thickness of the support would be less than that of the composite material; whereas, it is important for the thickness of the composite material to be equal to the thickness of the support at all times.

Stage c) is the stage when the "reinforcement" strip impregnated with resin 22 is wound onto the mandrel 4. In the case of cuts that are perpendicular to the motion direction (openings), it is important that the apertures made in two successive layers are perfectly overlaid. Theoretically, the control of the cutting system takes into account the increase in the radius of the part during manufacture. In practice, however, although the thickness of the layers is precisely calibrated, a slight deviation is possible. In order to avoid any risk of this nature, using a system for controlling the tension in the strip may be advisable in order to correct any such deviation and thereby to achieve the perfect overlay of the various layers. The tension may be very easily controlled by a tension roller and an actuator. The positioning of the layers may be continuously controlled by optical means with a camera and image processing. There are such systems used for monitoring the axial and lateral micro-displacements of specific points of a cut piece subjected to a tension test.

Stage d) relates to the polymerisation of the resin. Before polymerisation itself, the layer deposited is calibrated. The thickness of the fabric limits the minimum thickness of the layer that can be produced and therefore affects the radial precision of the part. However, the thickness of the fabric (about 125 µm) is normally much less than the total thickness of the part. In order to ensure the precision of the thickness of each layer, it is possible to radially move a roller, called a compressor roller or calibration roller. The radial motion d is synchronised with the axis of the mandrel so that d equals the thickness of the layer for each turn of the mandrel (formula of the spiral). Using a roller not only allows to control the thicknesses of the deposited layers but also to increase the volume of fibre $V_f$ by compression. It would therefore be possible to achieve fibre proportions of the order of 60% or more.

Figure 6:
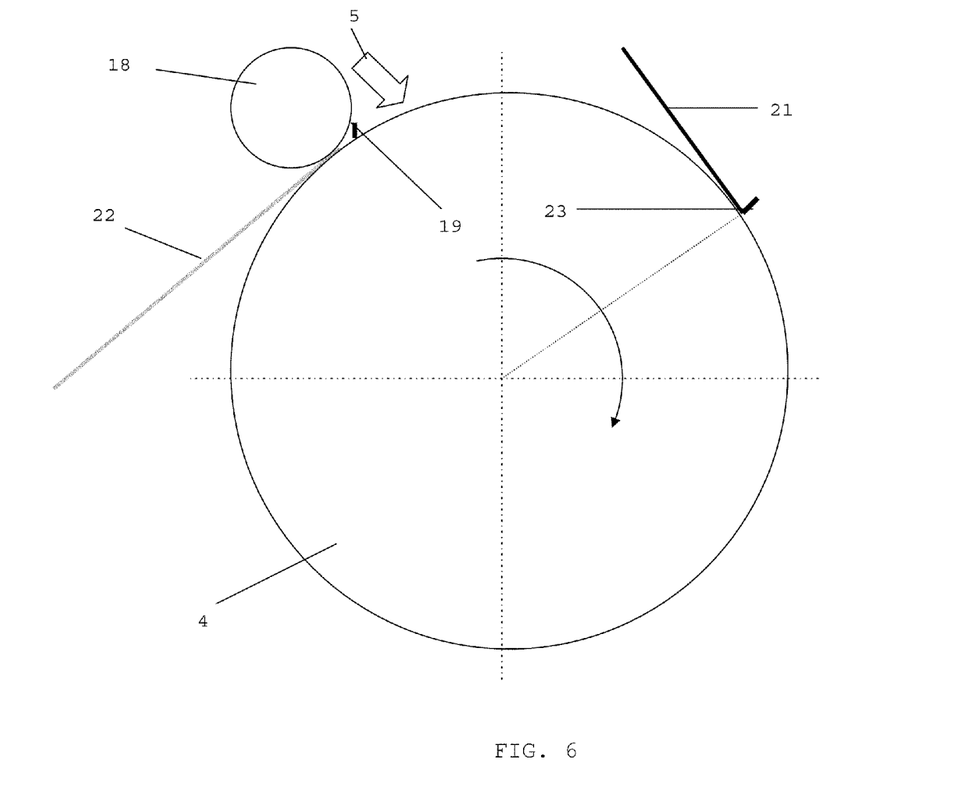
FIG. 6 shows a profile view of the mandrel on which the strips of fabric or braid are wound.

A scraper system preferably ensures a good surface condition after the passage of the roller. In this event, the scraper moves radially in step with the calibration roller. The configuration of the calibration roller 18 and of a first scraper 19 around the mandrel 4 is shown in FIG. 6. The impregnated reinforcement 22 is wound first and is then compressed to ensure a high fibre proportion Vf. The first scraper 19 is positioned before the IR or UV radiation source 5 in order to ensure a good surface condition.

The cross-linking of the resin may be initiated by UV or IR radiation 5. The advantage of UV radiation is that there is no risk of it melting the support material if the latter is of a type that could melt. The drawback is that UV does not penetrate the opaque fabric and the polymerisation of the layer of resin deposited on the lower parts of the fabric will be reduced. By contrast, infrared diffuses through the material, the heat being transferred by conduction, and ensures the polymerisation of the resin between two pleats. In the case of a support material that can melt, directing the IR radiation only onto the impregnated reinforcement may be useful, for example with a row of IR LEDs. It is also possible to choose a wavelength and intensity of radiation that does not damage the support material if the latter is liable to melt, for example in the case of wax. On the other hand, using IR as source not only causes no damage in the case of a soluble material such as plaster, but also allows to accelerate drying of the support. In the case of a 100% wax support, an alternative may be envisaged for heating the impregnated reinforcement without heating the wax: namely subjecting the cylindrical surface of the part being produced to a variable magnetic field. The currents induced in the carbon fabric (conductor) will heat it by the Joule effect. This creates a volume heat source that is distributed only where it is necessary. Wax, which is an electric insulator, will not be heated at all.

If necessary, post-polymerisation of the finished part is always possible although polymerisation during manufacture should be sufficient.

The last stage or stage e) relates to the deposition of the support. Two cases are envisaged. Either the support is made of the support material only, for example wax or plaster; in which case, "offcut" strips are not used. Or the support 21 is made of the reinforcement, i.e. the fabric (or flat braid) made from the "offcut" strips plus support material. In the first case, there are deposition techniques by spray heads as described in the TRM method (not shown in FIG. 4). In the second case, the reinforcement impregnated with hot wax or wet plaster 21 is wound around both sides of the composite material 20 so as to fill the gaps. A second scraper 23 ensures that the thicknesses of the composite material 20 and of the support 21 (see FIG. 6) are even. Then, the wax hardens upon cooling or the plaster hardens upon drying.

As a variant, the FRM method as described above may include an additional stage for stitching the reinforcement strips together in a direction that is perpendicular to the plane of the fabric; this allows to prevent any sliding of the strips of fabric and, as a result, ensures better interlaminar strength in the composite. The stitching stage occurs after stage d) on the partially polymerised impregnated reinforcement; the fabric or braid having to be soft enough to allow the insertion of the needle through it.

In this variant, a post-polymerisation cycle will then occur once the part is finished.

Comparison of the TRM and FRM Methods

It should be noted that the fabric reinforcement method (FRM) has several advantages compared with the thread reinforcement method (TRM):

the manufacturing pace of the fabric (or braid) reinforcement method is greater. Indeed, for producing a layer of width 1 with a thread of diameter D, 1/D turns of the mandrel are required, compared with a single turn for the FRM method. By way of an example, for a part manufactured with the FRM method by overlaying 40 reinforcement pleats, at a rate of 1 turn of the mandrel per minute, the time for manufacturing a part is less than one hour;

winding at about 90° in TRM mode will result in a weakness in terms of tensile strength of the part in the axial direction. The FRM method solves this problem thanks to a 0/90° fabric or 0/±60° braid;

the complexity of the TRM manufacturing method increases with the complexity of the part (see deposition of the fourth layer described in FIG. 3F). The FRM method does not pose this problem thanks to the automated cutting of the fabric;

the calibration roll used in the FRM method allows to both ensure the thickness of the layer deposited and to achieve a high proportion of fibre Vf;

post-polymerisation may possibly be avoided with FRM whereas it will probably always be necessary for the TRM method. Indeed, the zone located under the thread deposited being plunged into shadow, receives an insufficient density of UV, which results in partial polymerisation. To achieve a high degree of polymerisation, it is therefore necessary to subject the part to post-curing. By possibly avoiding this additional stage, FRM should offer lower manufacturing time and costs.

Advantages of the Thread and Fabric (or Braid) Reinforcement Method

As a conclusion, the two main advantages of the method as in the invention, whether with a fabric (or braid) reinforcement or with a thread one, may be recalled.

For one thing, this method allows to produce parts with rotational symmetry and complex cross-section (including projecting zones) in composite, which will allow to make the structures considerably lighter.

For another thing, this method allows to automate the manufacture of such parts, thus offering good reproducibility as well as reduced labour costs. This method also allows great flexibility in the parts obtained by contrast with documents EP 1 938 955 A1 and U.S. Pat. No. 5,176,864 A. An infinite number of parts can thus be produced on the same machine, the only condition being a minimum diameter for the part that must be greater than or equal to the diameter of the mandrel.

The invention claimed is:

1. Automated method for manufacturing layer by layer a composite part with rotational symmetry and complex cross-section, the method for manufacturing each layer comprising the steps of:
    a) continuously unwinding a reinforcement (1,11) from one of a reel or roll, said reinforcement being one of dry or pre-impregnated;
    b) impregnating the reinforcement with a liquid resin by passing the reinforcement through a bath (2) when the reinforcement of step a) is dry;
    c) continuously winding the impregnated or pre-impregnated reinforcement (22) onto a rotating cylindrical mandrel (4);
    d) at least partially polymerizing the impregnated or pre-impregnated reinforcement (22) in order to obtain a layer of composite material (20);
    e) continuously depositing a removable support (21,9) on both sides of the layer of composite material (20) being disposed onto the rotating cylindrical mandrel (4) to fill gaps surrounding the composite part.

2. Automated method of manufacture as in claim 1, wherein the reinforcement (11) is one of a fabric or a braid.

3. Automated method of manufacture as in claim 1, further comprising the step of automatically cutting the reinforcement (11) respectively into strips called reinforcement strips (15) and into strips called offcut strips (16) of a width that varies according to the geometry of the part to be produced after the step of continuously unwinding the reinforcement (1,11) from one of a reel or roll.

4. Automated method of manufacture as in claim 1, wherein, during the step of at least partially polymerizing the impregnated or pre-impregnated reinforcement (22), a heating by a Joule effect of the impregnated or pre-impregnated reinforcement (22) is performed by means of a variable magnetic field applied to the part being produced.

5. Automated method of manufacture as in claim 2, further comprising the step of stitching the impregnated or pre-impregnated reinforcements partially polymerised in step d), said stitching occurring in a direction that is perpendicular to the layers of the composite material (20).

6. Automated method of manufacture as claim 1, wherein, when the manufacturing layer by layer of the composite part is finished, there is an additional step of post-polymerisation.

7. Automated method of manufacture as in claim 1, wherein the resin is a thermosetting resin being catalysed by means of a photo-initiator or a thermo-initiator.

8. Automated method of manufacture as in claim 1, further comprising the step of removing the support (21,9) from said part and removing said part from the cylindrical mandrel (4).

9. Automated method of manufacture as in claim 3, wherein the support (21) comprises the offcut strips (16) impregnated with a support material (9).

10. Automated method of manufacture as in claim 9, wherein the impregnation of the offcut strips (16) occurs in parallel with the step of impregnating the reinforcement with a liquid resin.

11. Automated method of manufacture as in claim 1, wherein the deposition of the support material (9) is carried out by atomization of fine droplets by means of a spray head (6), said support material (9) being in liquid form with a viscosity that is suitable for spraying.

12. Automated method of manufacture as in claim 1, wherein the step of at least partially polymerizing includes initiating cross linking of the resin with one of ultraviolet or infrared radiation (5).

* * * * *